United States Patent
Hickey (10) Patent No.: US 7,744,940 B2
(45) Date of Patent: Jun. 29, 2010

(54) FOOD PRODUCT WARMING OR COOLING PACKAGE

(76) Inventor: Charles P. Hickey, 1432 Willow Way, Monroe, WI (US) 53566

( * ) Notice: Subject to any disclaimer, the term of this patent is extended or adjusted under 35 U.S.C. 154(b) by 1131 days.

(21) Appl. No.: 11/195,118

(22) Filed: Aug. 2, 2005

(65) Prior Publication Data
US 2006/0153955 A1 Jul. 13, 2006

Related U.S. Application Data

(60) Provisional application No. 60/641,967, filed on Jan. 7, 2005.

(51) Int. Cl.
*B65D 81/18* (2006.01)

(52) U.S. Cl. .............................. 426/109; 426/113; 62/4; 126/263.01; 126/263.05; 126/263.06; 126/263.07; 126/263.08; 126/263.09; 44/251; 44/252; 44/253

(58) Field of Classification Search ............. 62/4, 62/60; 126/263.01, 263.07, 263.09, 263.1, 126/246, 261, 62, 263.06, 265, 266, 267, 126/268, 269; 426/109; 44/250, 251, 252, 44/253; 607/114; 383/901
See application file for complete search history.

(56) References Cited

U.S. PATENT DOCUMENTS

| | | | |
|---|---|---|---|
| 654,174 A | 7/1900 | Murmann et al. | |
| 1,897,723 A | 2/1933 | Free | |
| 2,300,793 A | 11/1942 | Martin | |
| 2,916,886 A | 12/1959 | Robbins | |
| 3,542,032 A | 11/1970 | Spencer, Jr. et al. | |
| 3,865,117 A | 2/1975 | Perry, III | |
| 3,950,158 A * | 4/1976 | Gossett ............................ | 62/4 |
| 4,741,324 A * | 5/1988 | Ina et al. ................ | 126/263.06 |
| 4,856,651 A | 8/1989 | Francis, Jr. | |
| 5,220,909 A | 6/1993 | Pickard et al. | |
| 5,366,492 A | 11/1994 | Ueki | |
| 5,465,707 A * | 11/1995 | Fulcher et al. ......... | 126/263.08 |
| 5,626,022 A | 5/1997 | Scudder et al. | |
| 5,699,902 A | 12/1997 | Sperry et al. | |
| 5,935,486 A | 8/1999 | Bell et al. | |
| 5,941,078 A | 8/1999 | Scudder et al. | |
| 5,979,164 A | 11/1999 | Scudder et al. | |
| 6,036,004 A | 3/2000 | Bowen et al. | |
| 6,178,753 B1 | 1/2001 | Scudder et al. | |
| 6,248,257 B1 | 6/2001 | Bell et al. | |
| 6,289,889 B1 | 9/2001 | Bell et al. | |
| 6,338,252 B1 | 1/2002 | Calderaio | |
| 6,341,602 B1 | 1/2002 | Fulcher | |
| 6,351,953 B1 | 3/2002 | Scudder et al. | |

(Continued)

*Primary Examiner*—Steve Weinstein
*Assistant Examiner*—Chaim Smith
(74) *Attorney, Agent, or Firm*—Boyle Fredrickson, S.C.

(57) ABSTRACT

The present invention is a package for selectively heating or cooling a food product of the package utilizing a temperature-changing pack disposed within an inner container. The temperature-changing pack is formed in a manner which prevents the inadvertent or premature mixing of the chemical reagents to initiate the heating or cooling reaction. Further, the temperature-changing pack is positioned within the inner container at a location where the food product comes into contact with the pack on multiple sides to maximize the heat transfer between pack and the food product. The inner container can be positioned within a reusable outer sleeve that insulates the inner container to further maximize the heat transfer between the pack and the food product.

20 Claims, 7 Drawing Sheets

U.S. PATENT DOCUMENTS

| | | |
|---|---|---|
| 6,393,843 B2 | 5/2002 | Kohout |
| 6,484,514 B1 * | 11/2002 | Joseph et al. .................... 62/4 |
| 6,601,577 B2 | 8/2003 | Bouskila |
| 6,644,383 B2 | 11/2003 | Joseph et al. |
| 2003/0041854 A1 | 3/2003 | Sabin et al. |
| 2003/0140602 A1 * | 7/2003 | Liakopoulos et al. ......... 53/434 |
| 2004/0194472 A1 | 10/2004 | Wohland et al. |
| 2005/0000506 A1 * | 1/2005 | Schreff et al. .......... 126/263.09 |

* cited by examiner

FOOD PRODUCT WARMING OR COOLING PACKAGE

CROSS-REFERENCE TO RELATED APPLICATIONS

This application claims priority from U.S. Provisional Patent Application Ser. No. 60/641,967, filed on Jan. 7, 2005, and which is incorporated by reference herein in its entirety.

FIELD OF THE INVENTION

The present invention relates to packages for holding food products, and more specifically to a package or pouch capable of heating or cooling a food product contained within the package.

BACKGROUND OF THE INVENTION

Currently, a large number of food products or items are packaged in a manner that enables the food products to be easily transported and/or consumed. While the majority of these types of packaging allow for the food product to be easily held within the container until it is desired to consume the food product, some of these containers do not provide the ability to heat or cool the food product as desired prior to consuming it.

Thus, in order to enable the container to heat the product or cool the food product as desired prior to consumption, a number of different heating and cooling mechanisms have been developed for use with containers of this type. One of the more economical ways used to heat or cool a food product within the container holding the food product is a chemical heating or cooling pack disposed in the container in direct contact with the food product to be heated or cooled. The chemical pack includes a number of chemical reagents contained within separated compartments of the pack that can be ruptured to allow the reagents to mix. When the reagents in the chemical pack are mixed, the resulting reaction functions to supply or remove heat energy, thereby heating or cooling the food product held within the container in contact with the chemical pack.

However, when chemical packs of this type are utilized, significant problems with the heating or cooling of the food product in the container are still encountered. For example, the chemical pack positioned within the container is often not located in an optimal location for effectively heating or cooling the entire food product. In most containers of this type, the chemical pack is located on one side of the container and/or is secured to the container completely around the periphery of the pack. In these configurations, the food product to be warmed or cooled does not contact the chemical pack around the entire pack, resulting in a significant amount of heating or cooling energy generated by the pack that does not come into contact with the food product.

Further, in order to enable an individual to place a food product into, or remove the product from the container, an opening is formed in the container. However, in most containers, the opening is large enough for the individual to reach into the interior of the container and come into direct contact with the chemical pack, potentially injuring the individual. Also, because the chemicals used as the reactants in the chemical pack could be harmful if ingested by an individual, should one or more of the components of the pack rupture, the reagents can mix with the food product without any indication that this has occurred. Further, depending upon the particular reagents utilized and the structure of the chemical pack in which the reagents are contained, if the reactants leak in small amounts into contact with one another prior to activation of the pack, a runaway reaction may occur in which the desired temperature for the reaction is greatly exceeded, such that the reaction can damage or completely burn through the container holding the food product.

As a result, it is desirable to develop a self-heating or self-cooling food product package or pouch that avoids these deficiencies present in prior art self-heating and self-cooling containers.

SUMMARY OF THE INVENTION

According to a primary aspect of the present invention, a self-heating or self-cooling food package or pouch is provided which includes a chemical heating or cooling pack capable of heating or cooling a food product located within the package. The pack is secured within the package in a generally suspended position that enables the food product to be positioned around all sides of the pack to more effectively and efficiently heat or cool the food product.

According to another aspect of the present invention, the chemical pack is formed in such a way as to effectively prevent the premature mixing and reacting of the chemical reagents to ensure that the heating or cooling reaction is only initiated when desired. In addition, the pack also includes a number of internal features which enable the reaction to occur more evenly such that a relatively constant level of heating or cooling is supplied from the pack to the food product. The chemical reagents utilized in the pack are also combined with an indicator to provide a visual indication if the reagents have leaked out of the pack and have or will contaminate the food product.

According to another aspect of the present invention, the package is formed with an inner container in which the food product is contained along with the chemical pack, and a reusable outer sleeve that is positionable around the inner container to function as an insulating layer. The outer sleeve enables the food product to be heated or cooled in still a more efficient manner by reflecting the heating or cooling energy generated by the chemical pack that would otherwise escape through the sides of the inner container onto the food product while also preventing contact by an individual with the heating or cooling energy generated by the pack.

According to still another aspect of the present invention, the package includes a strip of material positioned within the package between the opening through which the food product can be introduced into and withdrawn from the package, and the chemical pack. The strip extends across the package to prevent an individual from reaching through the opening and contacting the pack, while allowing the food product to pass around or through the strip in order to be heated or cooled by the chemical pack.

Numerous other aspects, features and advantages of the present invention will be made apparent from the following detailed description taken together with the drawing figures.

BRIEF DESCRIPTION OF THE DRAWINGS

The drawings illustrate the best mode currently contemplated as practicing the present invention.

In the drawings.

DETAILED DESCRIPTION OF THE INVENTION

Figure 1:
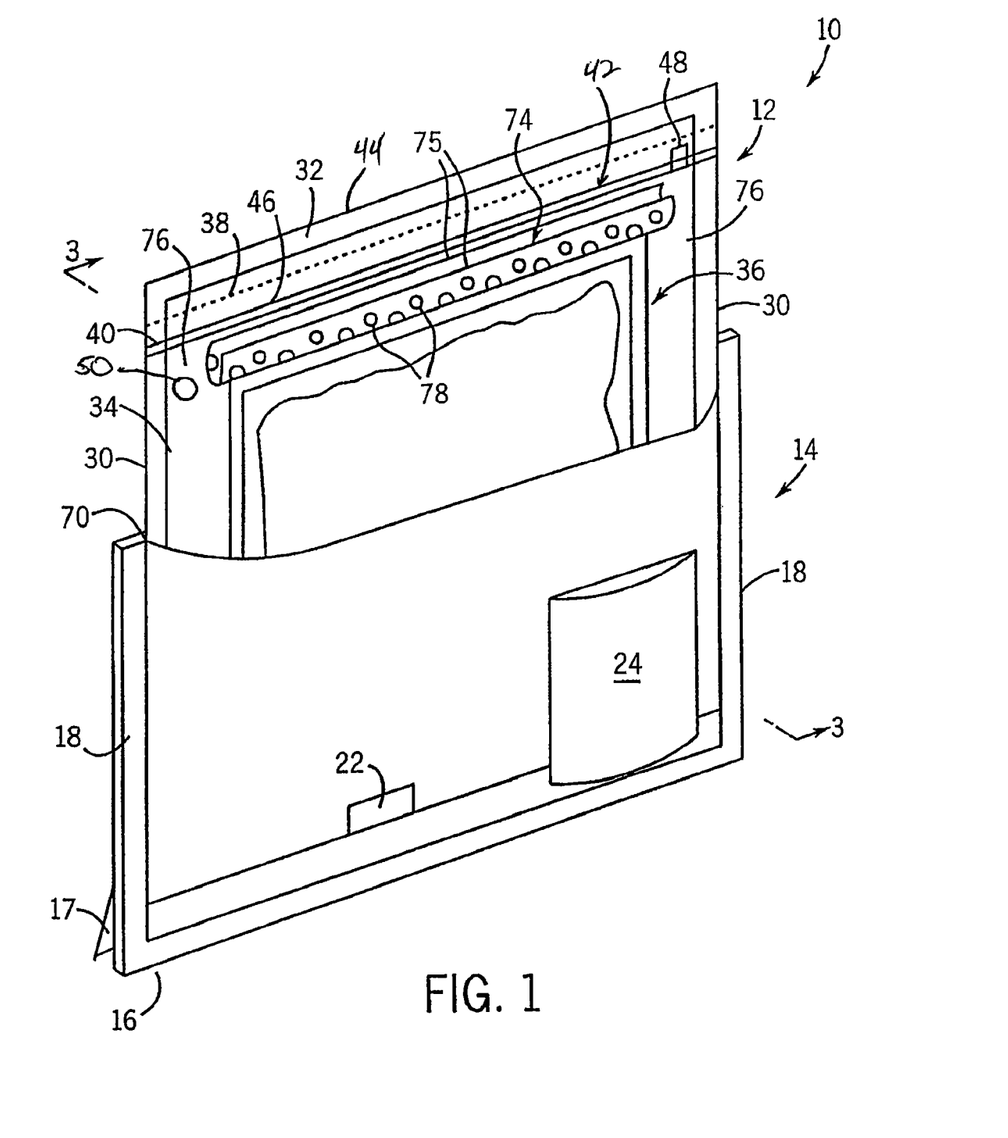
FIG. 1 is a perspective view of the self-heating or self-cooling package of the present invention.

With reference now to the drawing figures in which like reference numerals designate like parts throughout the disclosure, the self-heating/self-cooling food product package or pouch is illustrated generally at 10 in FIG. 1. The pouch 10 includes an inner container 12 and an outer container 14.

Figure 2:
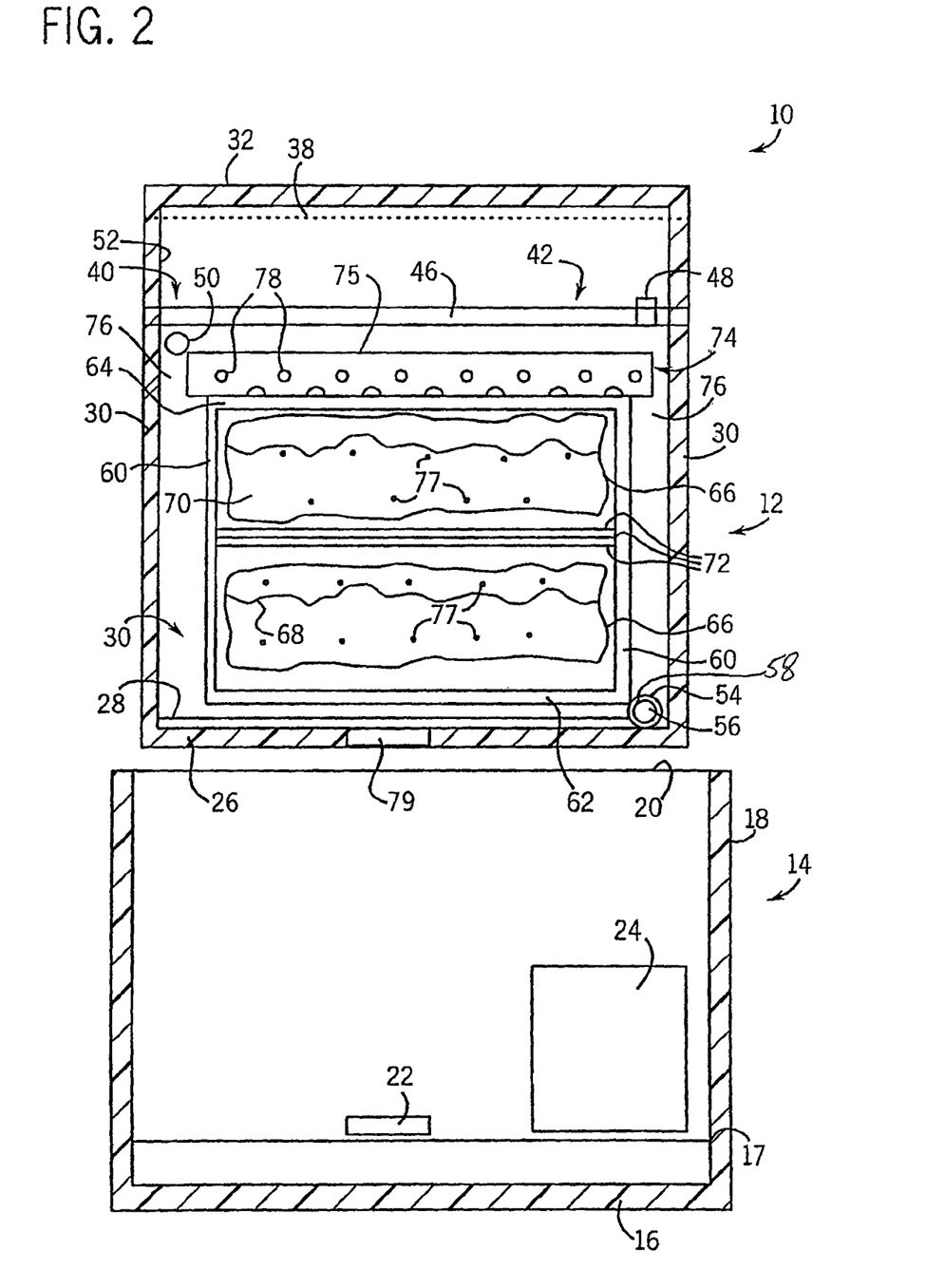
FIG. 2 is an exploded, side plan view of the package of FIG. 1.
Figure 3:
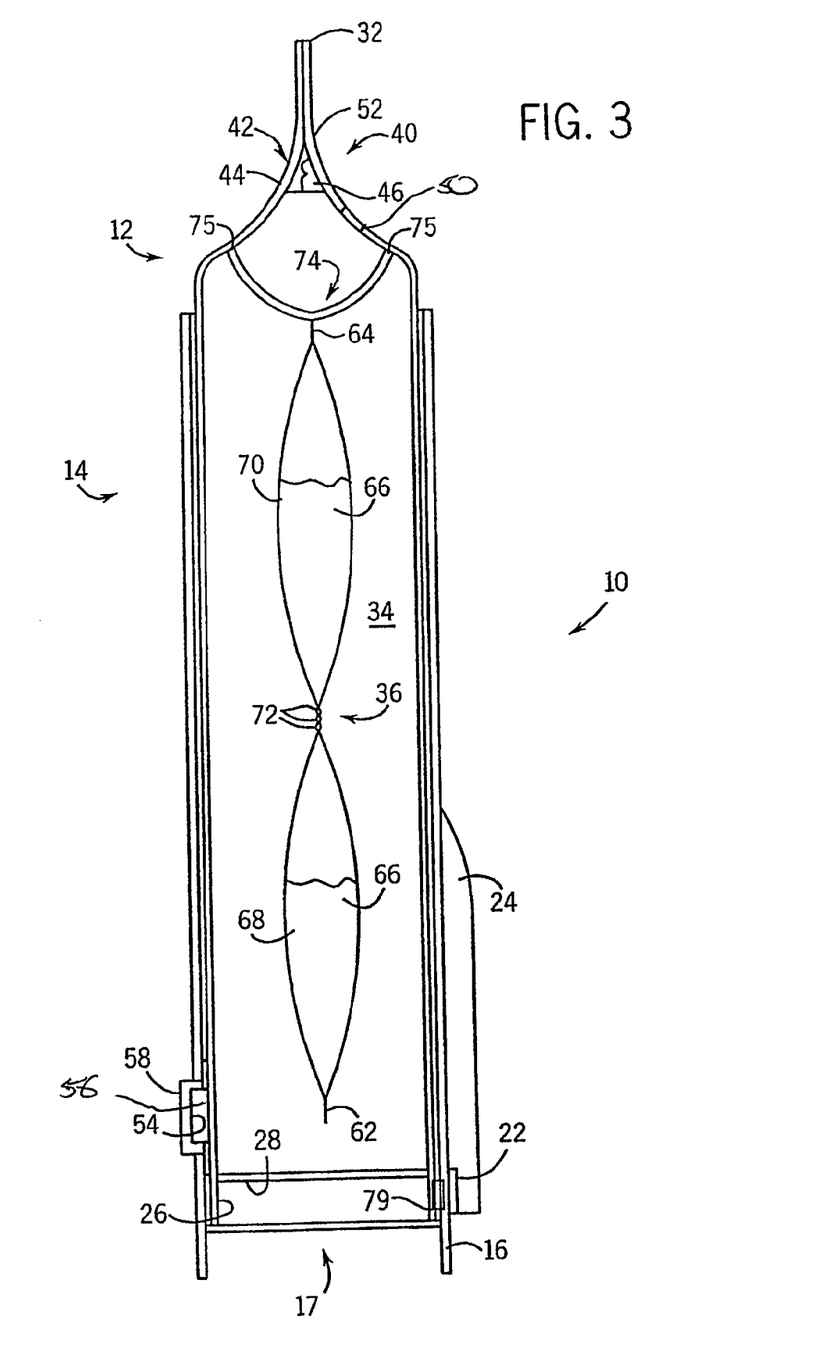
FIG. 3 is a cross-sectional view along line 3-3 of FIG. 1.

Referring now to FIGS. 1-3, the outer container 14 is formed as a sleeve having a bottom end 16, with an optional gusset 17, a pair of side walls 18, and an open top end 20. The outer container 14 is heat sealed along the bottom end 16 and side walls 18 and is preferably formed of an insulating material to contain the heating or cooling energy generated from within the inner container 12 inside the outer container 14. Most preferably, the insulating material forming the outer container 14 is a layered material including a first layer of high density polyethylene, a second layer of a microfoam, and a third layer of low density polyethylene. The insulating material may also be formed to have an additional layer including a number of air pockets (not shown) in conjunction with a reflective layer, such as aluminum, that is positioned on the inner the layer around the entire inner surface of the outer container 14 such that the air contained within the pockets forms an additional insulating layer for the outer container 14. The outer container 14 also includes a window 22, preferably located adjacent the bottom end 16 of the outer container 14, such that an individual can view the aligned location on the inner container 12 when the inner container 12 is positioned within the outer container 14 for a purpose to be described.

To facilitate the use of the pouch 10, the outer container 14 also includes a separate holding element 24 secured to the exterior of the outer container 14 and capable of holding a number of the fingers on the hand of the individual using the pouch 10. The element 24 can be formed integrally with, or separately from the outer container 12, and also can be formed of the same material or a different material from the outer container 12. Additionally, the exterior of the outer container 14 can include indicia (not shown) that provides various information to the individual utilizing the pouch 10, such as where and how to properly use the pouch 10 to heat or cool a food product (not shown), such as milk, soup, noodles, water, etc, positioned therein. The indicia can take any conventional form, such as being printed directly on the exterior of the outer container 14, or in the form of labels (not shown) that are attached to the exterior of the outer container 14.

Looking now at FIGS. 1-5, the inner container 12 is designed to be slidably received within the outer container 14 and is formed of a suitable material, and preferably a heat-sealable material, and includes a bottom end 26, optionally, with an optional gusset 28, along the bottom end 26, a pair of side edges 30, and a top end 32. The inner container 12 sealed along the side edges 30 and bottom end 26 to form an enclosure 34 within which is positioned a temperature-changing pack 36. The inner container 12 is preferably formed of a suitable thermosetting or thermoplastic material such that the inner container 12 can be preferably heat sealed in a conventional manner to form the container 12. In a particularly preferred embodiment, the inner container 12 is formed of a material that is capable of maintaining its integrity within the operating temperature range for the pouch 10, i.e., between about 0° C. and about 150° C.

The top end 32 of the inner container 12 is formed to be easily openable by an individual in order to enable the placement of the food product within the inner container 12. In a preferred embodiment, the top end 32 includes a number of perforations 38 or other easily separable structure extending across the inner container 12 parallel to the top end 32 that enables the top end 32 to be removed from the inner container 12. The inner container 12 also includes a sealing mechanism 40 disposed below the top end 32 between the enclosure 34 and the perforations 38 that can be utilized to selectively seal and unseal the enclosure 34 defined within the inner container 12 after the perforations 38 have been used to remove the top end 32. In a particularly preferred embodiment, the sealing mechanism 40 comprises a slide mechanism 42 having a pair of engageable halves 44 and 46 disposed on each side of the inner container 12 that are optionally selectively engaged and disengaged with one another by a zipper 48 slidably engaged with each half 44 and 46, but which can be directly engaged with one another as well. In any configuration, the sealing mechanism 40 is also formed of a material capable of withstanding the temperatures created in the inner container 12 by the pack 36.

As best shown in FIG. 2, the inner container 12 also optionally includes a vent 50 disposed in a preferred embodiment directly adjacent the sealing mechanism 40. The vent 50 is preferably a one-way vent in order to enable any gas, e.g., steam, that is generated during the heating or cooling of the food product within the inner container 12 to escape the inner container 12 through the vent 50, thereby preventing the over-expansion and breakage of the inner container 12.

In addition, or as a substitute for the vent 50, the top end 32 can also be formed with the extended portion 52 between the perforations 38 and the sealing mechanism 40. The extended portion 52 is present in order to allow the portion 52 to be folded over on itself after the removal of the top end 32 along the perforations 38. By folding the portion 52 over on itself, any pressure created by the build up of gases within the enclosure 34 of the container 12 that is sufficient to break or rupture the sealing mechanism 40 can be dispensed in a controlled manner through the folded over portion 52 without expelling the contents of the container 12 in significant amounts through the sealing mechanism 40.

In one embodiment of the pouch 10 shown in FIGS. 2 and 3, to facilitate the dispensing of the heated or cooled food product from the inner container 12, the container 12 also includes a pour spout 54 that is attached to the inner container 12. The spout 54 can be sealed over and around an opening 56 in the inner container 12, or integrally formed with the inner container 12. The spout 54 can be selectively opened and closed, such as by a cap 58 releasably engaged with the spout 54, to enable the food product that has been heated or cooled in the enclosure to be dispensed from or introduced into the inner container 12 through the spout 54. In a preferred embodiment, the spout 54 is externally threaded such that an internally threaded cap 58 can be engaged with the spout 54 and used to selectively open and close the spout 54.

Looking now at FIGS. 1-3, in order to provide the heating or cooling energy to the food product positioned within the inner container 12, the temperature-changing pack 36 is positioned within the inner container 12. The pack 36 is preferably positioned below the vent 50, but above the bottom end 26 of the inner container 12 and the spout 54. The temperature-changing pack 36 is formed in any desirable shape, but preferably is generally rectangular in shape with a pair of opposed side edges 60, as well as a bottom edge 62 and a top edge 64. The pack 36 is formed of a material that can easily transmit heat through the material, and is also preferably a heat sealable material to assist in forming the pack 36. In a particularly preferred embodiment, the material forming the pack 36 is a polyester film covering an aluminum foil in order to aid in preventing the bursting or leaking of the pack 36 when it is activated and during the reaction taking place within the pack 36. However, other suitable materials may also be utilized to form the pack 36.

Figure 8:
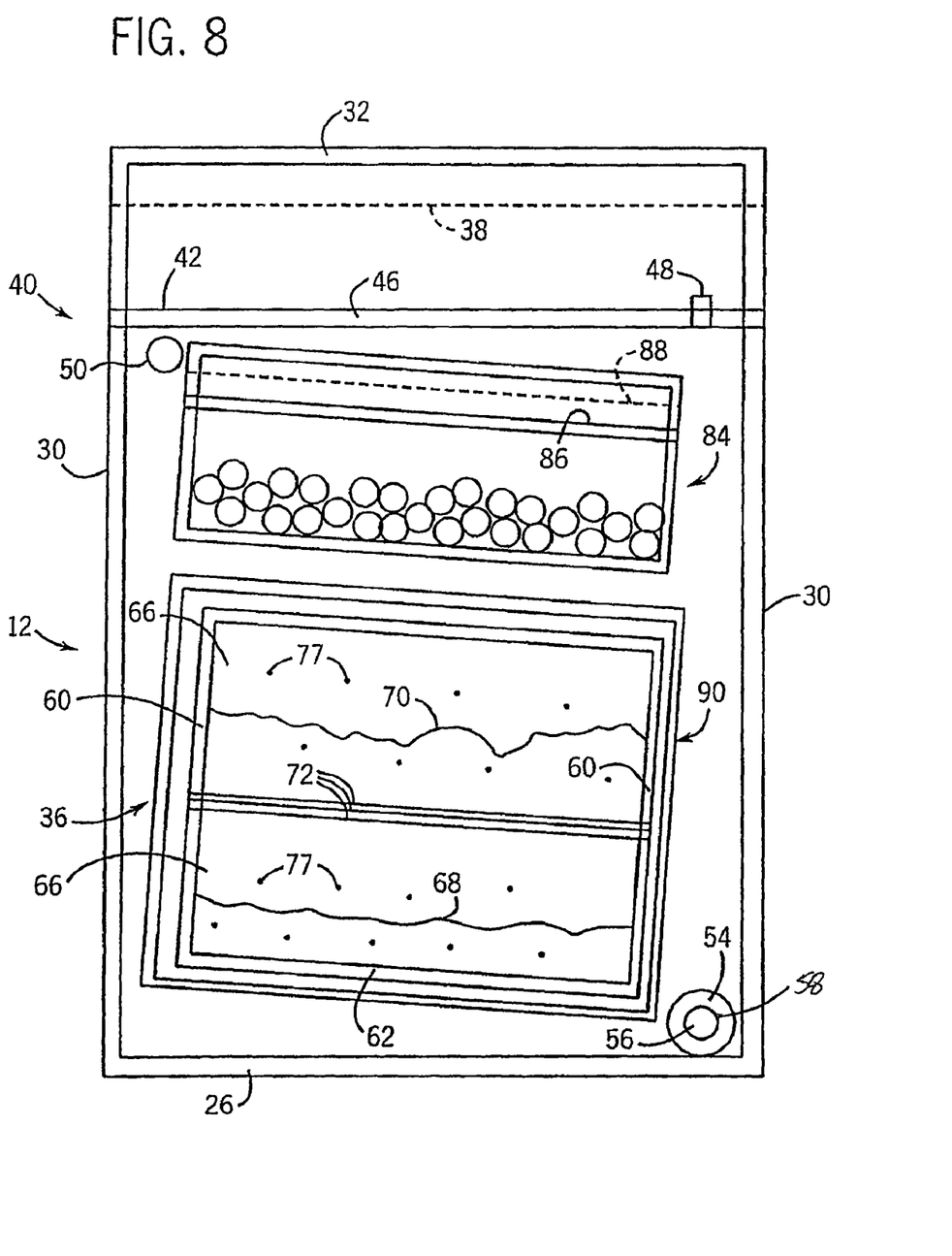
FIG. 8 is a side plan view of a fourth embodiment of the package of FIG. 1.

The pack 36 is held in a generally suspended position within the enclosure 30 of the inner container 12 by attaching the pair of side edges 60 of the pack 36 to opposed portions of the inner container 12, such as by a suitable adhesive or mechanical fastening means. However, in a preferred embodiment, because the pack 36 is formed of a heat-sealable material, the side edges 60 can be sealed directly to the inner container 12. In addition, the side edges 60 of the pack 36 can be attached or sealed to the inner container 12 subsequently to, or at the same time as the seals forming the side edges 30 of the inner container 12 are formed, where the seals forming the side edges 30, and the seals connecting the side edges 60 to the inner container 12 are formed at different locations from one another. Furthermore, the side edges 60 of the pack 36 can be sealed to the inner container 12 such that the pack 36 has any desired angular position with respect to the side edges 30 of the inner container 12 (FIGS. 4 and 5), and is preferably only secured to the container 12 at a number of discrete points along each side edge 60 to suspend the pack 36 within the inner container 12, as best shown in FIGS. 1 and 2. Additionally, the pack 36 can be secured to one side of the container 12 along the top edge 64, or can be left unattached to the container 12 within the enclosure 30 (FIG. 8).

In a preferred embodiment shown in FIGS. 1-3, the pack 36 is suspended within the enclosure 34 by a safety strip 74 sealed to opposed sides of the inner container 12. The strip 74 is formed of a material similar to that used to form the inner container 12, and has a pair of side edges 75 that are preferably heat sealed to each side of the container 12 to form a U-shaped strip 74. The strip 74 has an overall length less than the width of the enclosure 34 formed in the inner container 12, such that the strip 74 defines spaces 76 between each end of the strip 74 and the side edges 32. The strip 74 may also optionally include a number of apertures 78 formed therein along the length of the strip 74 in any desired shape or configuration. The presence of the spaces 76 and apertures 78 allows the food product that is dispensed into the enclosure 34 of the container 12 through the top end 32 to flow into the enclosure 34 around the strip 74 either through the spaces 76 or apertures 78. Because one of the main purposes of the strip 74 is to prevent direct contact with the pack 36 in the inner container 12, the width of the spaces 76 and size of the apertures 78 can be varied, but are each required to be small enough in width to prevent an individual from being able to reach through the spaces 76 into the enclosure 34 and come into direct contact with the pack 36.

The pack 36 can be attached to the strip 74 along the top edge 64, and preferably at the lowermost point of the strip 74, such as by heat sealing, thereby completely suspending the pack 36 within the interior of the enclosure 30. In this configuration, the pack 36 is optimally positioned for circulation of the food product around the pack 36 in order to obtain the maximum heating or cooling of the food product, while the safety strip 74 allows for the introduction of the food product into the enclosure 34 while also preventing an individual from coming into direct contact with the pack 36. Additionally, the strip 74 is preferably angled with respect to the bottom end 26 and top end 32 of the inner container 12, such that any food product dispensed onto the strip 74 that does not run through the apertures 78 is urged along the strip 74 into one of the spaces 76.

By securing the pack 36 in a suspended configuration within the inner container 12 above the bottom end 26, or allowing the pack 36 to move freely within the container 12, the pack 36 can more efficiently heat or cool the food product by allowing the food product to flow or otherwise move entirely around the periphery of the pack 36. To maximize the effectiveness of the pack 36 in heating or cooling the food product within the inner container 12, the inner container 12 and temperature-changing pack 36 are formed to have dimensions which prevent the food product from being spaced from the temperature-changing pack 36 more than one-half of one inch (½').

Figure 4:
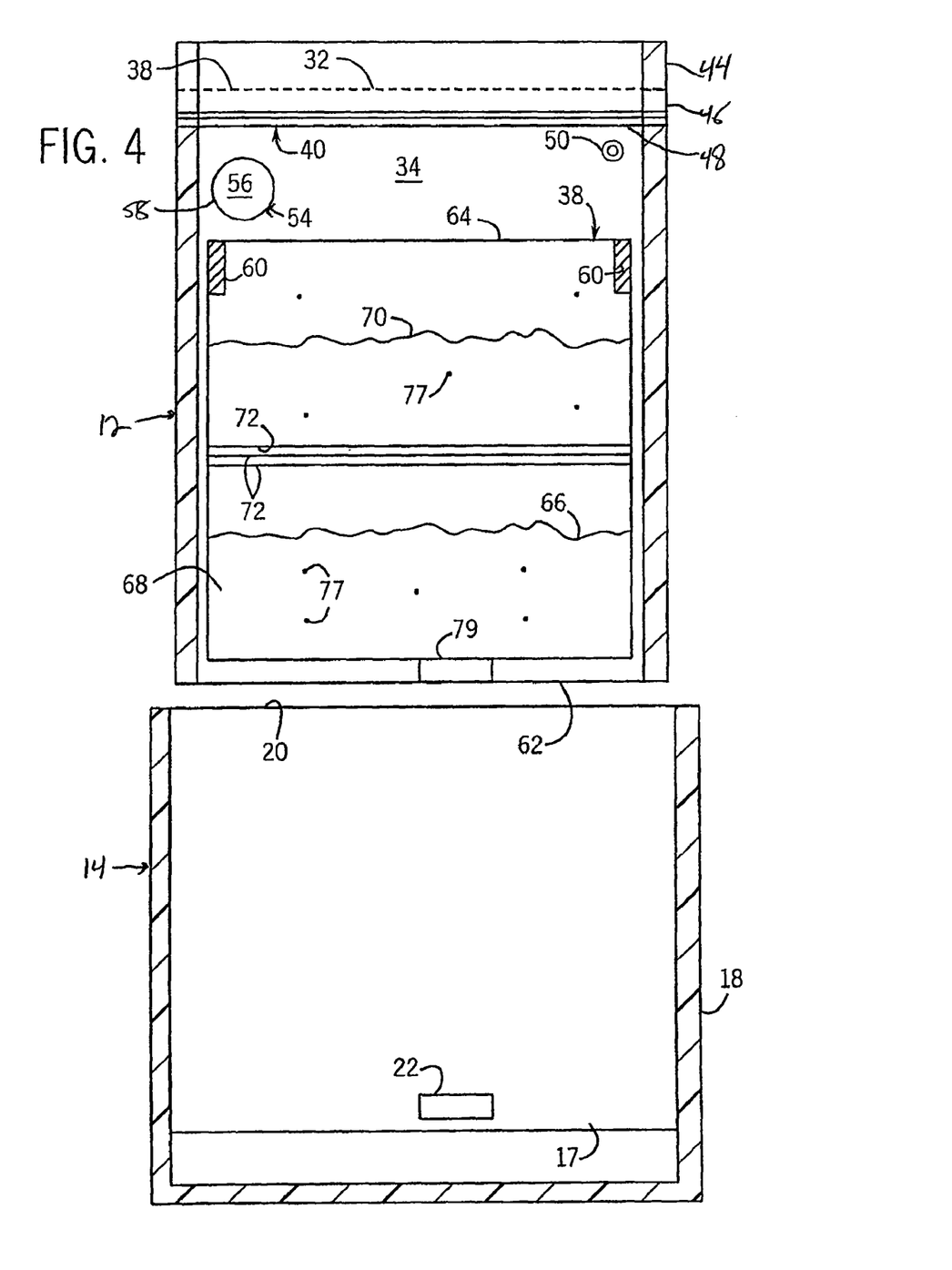
FIG. 4 is an exploded, side plan view of a second embodiment of the package of FIG. 1.
Figure 5:
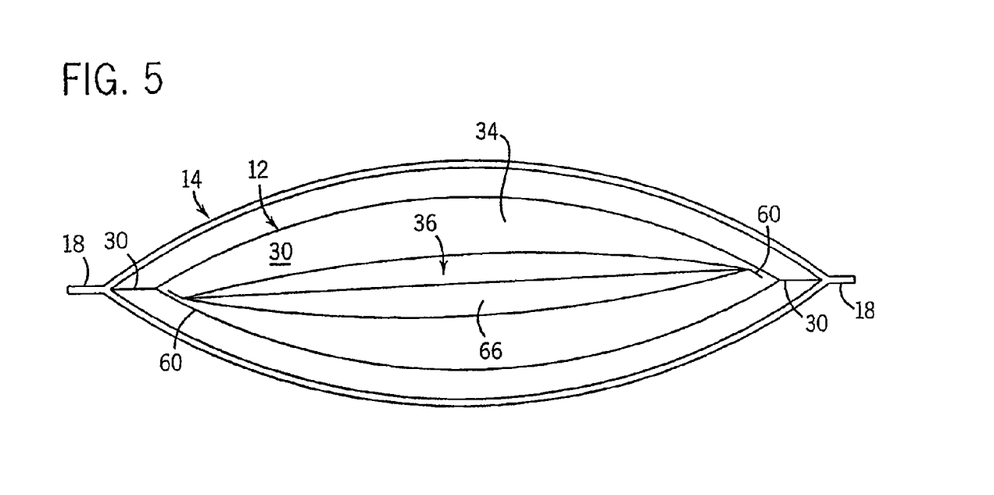
FIG. 5 is a top plan view of package of FIG. 4.
Figure 6:
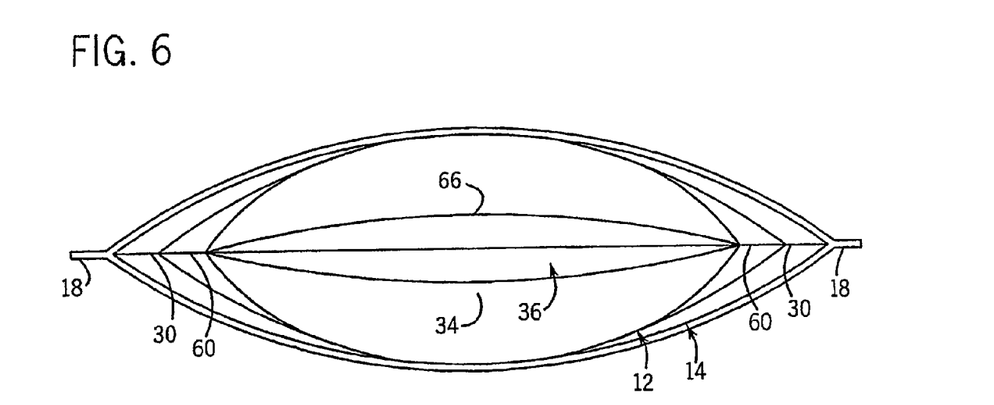
FIG. 6 is a top plan view of a third alternative embodiment of the package of FIG. 1.

Looking now at FIGS. 2 and 4, the temperature-changing pack 36 includes a pair of compartments 66 which hold the reagents 68 and 70 utilized to create the heating or cooling reaction provided by the pack 36. The compartments 66 are separated by multiple frangible seals 72 which can be formed simultaneously with or separately from the seals located at the various edges 60, 62, 64 of the temperature-changing pack 36. The multiple frangible seals 72 are spaced from one another and provide a redundant sealing mechanism between the compartments 66 in order to prevent any inadvertent mixing of the reagents 68 and 70 prior to the intended breaking of all of the frangible seals 72 by an individual to initiate the heating or cooling reaction. While the compartments 66 and frangible seals 72 are illustrated as being oriented in a horizontal configuration, it is also contemplated that the compartments 66 and seals 72 can be oriented in any desired configuration, such as vertically, diagonally, or in the form of concentric circles, among others.

The reagents 68 and 70 held within the compartments 66 can be selected to generate either an exothermic or an endothermic reaction depending upon the type of food product to be prepared with the pouch 10, and are preferably selected to be a solid reagent 68 and a liquid reagent 70. The reagents 68 and 70 can be positioned within the compartments 66 in any order, but in a preferred configuration the liquid reagent 70 is positioned in the compartment 66 above the compartment 66 holding the solid reagent 68, to assist in generating the reaction when the liquid reagent 70 comes into contact with the solid reagent 68 during activation of the pack 36. Additionally, the solid or liquid reagent may include an amount of an acid to buffer a basic solid reagent and the resulting solution formed by the reaction to increase the heat output of the reaction, as well as to lessen any risk to an individual utilizing the container 10 when potentially contacting the reagents 68 and 70. Further, the liquid reagent 70 may include, as a safety feature, a dye (not shown) having an easily discernable color, e.g., black, which will color the food product being warmed or cooled in order to provide a visual indication that the pack 36 has ruptured and dispensed the reagents 68, 70 into the food product, thereby preventing an individual from ingesting the food product. In another embodiment, best shown in FIG. 8, where the pack 36 is not secured to the inner container 12 within the enclosure 34, the pack 36 can be enclosed within a separate package 90 formed of a material similar to that of the inner container 12 or the pack 36 to provide an additional barrier between the food product and the reagents 68 and 70 in the pack 36.

To enhance the ability of the reagents 68 and 70 to mix evenly with one another and provide a generally steady supply or removal of energy to heat or cool the food product, each compartment 66 can include a number of frangible dots 77 spaced throughout the compartments 66. The dots 77 secure opposite sides of each compartment 66 together at each point where a dot 77 is formed in order to more effectively distribute the reagents 68 and 70 throughout the respective compartments 66. Additionally, the presence of the dots 77 effectively prevents clumping or pooling of the reagents 68 and 70 within the compartments 66, and therefore reduces the stress on the frangible seals 72 such that the integrity of the seals 72 is more effectively maintained until it is desired to rupture the seals 72. This purpose can also be enhanced by forming the solid reagent 68 into a tablet or pill form, which is more easily held in an evenly distributed manner in the compartment 66 around the dots 77. Further, instead of or in addition to the dots 77, other additives (not shown) such as a dry acid, cellulose, or glass beads can be added to the solid reagent 68 to prevent clumping of the solid reagent 68.

In order to absorb any gas, e.g., steam, generated by the reagents 68 and 70 when mixed, one of the reagents 68 and 70 may also include a gas absorbing material (not shown) that functions to absorb gas generated by the reagents in order to prevent rupturing of the temperature-changing pack 36. The pack 36 may also include a one-way vent (not shown) for this purpose, similar to the vent 50 on the inner container 12. Further, the temperature-changing pack 36 can be formed such that the compartment 66 containing the solid reagent 68 is vacuum sealed or flushed with an inert gas in order to prevent any premature reacting of the reagent 66 with any carbon dioxide or moisture contained within the ambient air present within the compartment 66. Also, other additives can be added to one or both reagents 68 and 70 for other various purposes, including anti-freeze additives, among others.

In one example, in order to heat a food product, such as milk, from approximately 36° F. to a temperature of approximately 100° F. in approximately one minute, the reagents 68, 70 located within the compartments 66 of the pack 36 are selected to be a solid reagent 68 including forty (40) grams of calcium oxide, six (6) grams of sulfamic acid, and a minimum of (14) grams of glass beads of approximately three to four (3-4) millimeters in diameter, and a liquid reagent 70 including three (3) ounces of water.

Looking now at FIGS. 2 and 3, the inner container 12 also includes a thermometer 79 disposed adjacent the bottom edge 62 of the temperature-changing pack 36. When the inner container 12 is positioned within the outer container 14, the thermometer 79 is aligned with the window 22 in the outer container 14 such that an individual can easily view the temperature of the food product held within the inner container 12. In a preferred embodiment, the thermometer 79 takes the form of a liquid crystal thermometer capable of illustrating a range of temperatures for the food product being warmed or cooled within the container 12. Alternatively, the thermometer 79 can be positioned on another portion of the inner container 12, with the corresponding window 22 on the outer container 14 being aligned therewith.

Figure 7:
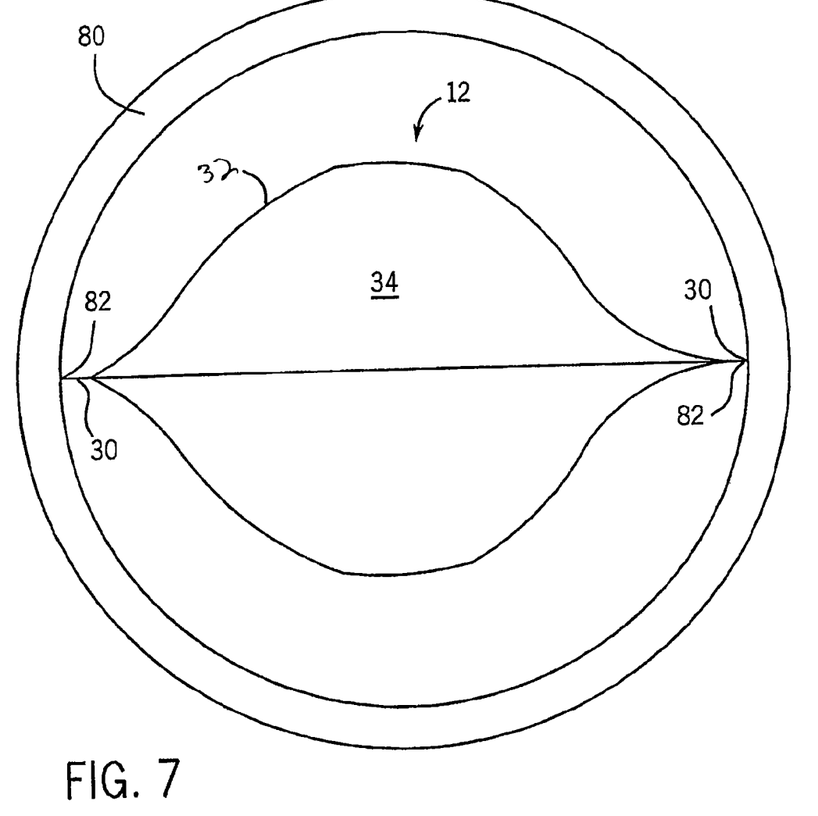
FIG. 7 is a top plan view of an opening ring engaged with the inner container of the package of FIG. 1.

Referring now to FIG. 7, when it is desired to introduce the food product into the inner container 12 through the top end 32, a plastic ring 80 can be engaged with the side edges 30 of the inner container 12 to expand the top end 32 of the container 12. The ring 80 includes a pair of opposed notches 82 that engage the opposed side edges 32 of the inner container 12 and flex the container 12 into an open position. The food product can then be introduced into the container 12 for heating or cooling by the temperature-changing pack 36. The ring 80 can also be used to engage and withdraw the inner container 12 from within the outer container 14 once the food product has been heated or cooled as desired. Additionally, the ring 80 or similar structure can be formed integrally with the inner container 12, such that when the sealing mechanism 40 is disengaged, the ring 80 operates to urge the top end 32 and the inner container 12 into an open, or bowl-like configuration, in order to enable an individual to consume the food product directly out of the inner container 12.

Looking now at FIG. 8, in addition to the previous embodiments, the pouch 10 may include a separate food product container 84 positionable within the inner container 12 and utilized to contain the food product. The food product in the container 84 can be prepared directly by activation of the pack 36, or an amount of water (not shown) can added to the inner container 12 in addition to the food product container 84 in order to more efficiently transfer the heating or cooling energy from the pack 36 to the food product held within the container 84. Once the product in the container 84 is heated or cooled to the desired temperature, the container 84 can be removed from within the inner container 12 and opened along perforations 88, such as into a bowl-shaped configuration using a biasing structure 86 similar to the ring 80, formed separately from or integrally with the container 84, to enable the food product to be further prepared and/or consumed by an individual.

Various alternatives are contemplated as being within the scope of the following claims particularly pointing out and distinctly claiming the subject matter regarded as the invention.

What is claimed is:

1. A self-heating or self-cooling food package the package comprising:
   a) a container, containing said food, said container having a bottom end, a pair of side edges, and a selectively openable top end; and
   b) a temperature-changing element positioned within the container and secured to the container, the temperature-changing element including a pair of compartments separated by at least two frangible seals each of said compartments enclosing one of a pair of reagents respectively, which reagents when combined either heat or cool the food product therein, wherein the temperature-changing element is attached to and vertically held in a suspended position above the bottom end and below the top end of the container by a safety strip positioned within the upper portion of and extending substantially across the container, said safety strip forming a barrier in the container below the top end to prevent an individual from being able to reach into the interior of the container and come into direct contact with the temperature-changing element when the top end is opened, while enabling fluids to flow around the safety strip and out of the container.

2. The package of claim 1 wherein at least one of the compartments of the temperature-changing element includes a number of frangible dots, which secure opposite sides of the compartment together.

3. The package of claim 1 wherein the safety strip defines at least one space between the safety strip and the inner container.

4. The package of claim 1 wherein the safety strip includes a number of apertures extending through the safety strip.

5. The package of claim 1 wherein the safety strip is positioned at an angle with respect to the inner container.

6. The package of claim 1 wherein the temperature-changing element is secured to the inner container through the safety strip adjacent a top edge of the element.

7. The package of claim 1 wherein the temperature-changing element and the inner container are spaced from one another a distance of no greater than one-half inch.

8. The package of claim 1 wherein the temperature-changing element is disposed within a reagent barrier.

9. The package of claim 1 wherein at least one of the pair of compartments in the temperature-changing element is vacuum-sealed.

10. The package of claim 1 wherein at least one of the pair of compartments of the temperature-changing element is flushed with inert gas.

11. The package of claim 1 wherein the inner container includes a selectively openable spout.

12. The package of claim 1 further comprising at least one one-way valve positioned on one of the inner container or the temperature-changing element.

13. The package of claim 1 further comprising an outer insulating sleeve selectively positionable around the inner container.

14. The package of claim 13 wherein the outer sleeve includes a gripping element disposed on the outer sleeve.

15. The package of claim 1 wherein the one of the reagents in the temperature-changing element includes a dye.

16. The package of claim 1 further comprising a spout on the inner container.

17. The package of claim 16 further comprising a cap releasably engageable with the spout.

18. The package of claim 1 wherein the one of the reagents in the temperature-changing element includes an anti-clumping additive.

19. The package of claim 18 wherein the additive is a number of glass beads.

20. The package of claim 1 further comprising a container-opening structure engaged with the inner container.

* * * * *